United States Patent [19]

Blondet et al.

[11] 4,051,329
[45] Sept. 27, 1977

[54] AN OPTICAL INFORMATION RECORDING SYSTEM IN WHICH THE ENERGY WHEN TRANSMITTED TO THE RECORDING LAYER IS CONSTANT

[75] Inventors: Bruno Blondet; Sylvain Kretschmer; Jean Pierre Lacotte; Jean Paul Peltier, all of Paris, France

[73] Assignee: Thomson-Brandt, Paris, France

[21] Appl. No.: 667,442

[22] Filed: Mar. 16, 1976

[30] Foreign Application Priority Data

Mar. 21, 1975    France ............... 75.08945

[51] Int. Cl.² .................. G11B 7/72; H04N 5/76; H04N 5/84
[52] U.S. Cl. ............. 179/100.3 N; 179/100.3 V; 179/100.3 GN; 346/108; 358/127; 358/128; 358/130
[58] Field of Search ............... 179/100.3 V, 100.3 F, 179/100.3 N, 100.3 GN, 100.3 P, 100.3 M; 346/108, 76 L; 358/127, 128, 130, 132; 340/173 LJ, 173 LM; 250/201

[56] References Cited

U.S. PATENT DOCUMENTS

| 2,274,530 | 2/1942 | Collins | 179/100.3 N |
|---|---|---|---|
| 2,297,450 | 9/1942 | Becker | 179/100.3 N |
| 2,343,674 | 3/1944 | Kellogg | 179/100.3 GN |
| 2,360,012 | 10/1944 | Reiskind | 179/100.3 GN |
| 3,654,624 | 4/1972 | Becker et al. | 346/76 L |
| 3,787,887 | 1/1974 | Burton | 346/108 |
| 3,787,888 | 1/1974 | Haskal | 346/108 |

FOREIGN PATENT DOCUMENTS

| 306,438 | 2/1929 | United Kingdom | 179/100.3 P |
| 498,394 | 1/1939 | United Kingdom | 179/100.3 P |

OTHER PUBLICATIONS

A Review of the MCA Disco-Vision System, Broadbent, J of the SMPTE, vol. 83, pp. 554-559, 7/74.

*Primary Examiner*—Raymond F. Cardillo, Jr.
*Attorney, Agent, or Firm*—Cushman, Darby & Cushman

[57] ABSTRACT

The invention relates to a system optically recording information, by the insolation of a photosensitive layer deposited on a substrate, on a track of substantially constant width. The system comprises a device for controlling the energy emitted by the source in response to the non-uniformity of the reflexion coefficient of said surface, said control device being such that the energy actually transmitted to the photosensitive layer is constant when the modulation signal has the value 1.

5 Claims, 5 Drawing Figures

AN OPTICAL INFORMATION RECORDING SYSTEM IN WHICH THE ENERGY WHEN TRANSMITTED TO THE RECORDING LAYER IS CONSTANT

The invention relates to the optical recording of information upon a photosensitive layer deposited on a carrier in the form of a disc or tape intended to perform the function of information carrier.

In known recording systems, the energy emitted by the coherent light source is, except for modulation, a constant quantity so that the energy received by the photosensitive layer when the modulation signal has the value 1 is constant.

However, experience has shown that, under these conditions, the energy actually transmitted to the photosensitive layer varies. This phenomenon is due to the fact that the transmission coefficient (and hence the reflexion coefficient) of the diopter formed by the air and the photosensitive layer varies rapidly for minor variations in the thickness of the various underlying layers which form the support and which are, for example, a layer of glass and a thin metallic layer onto which the photosensitive layer is deposited.

In order to ensure that, for reading, the diffraction of the reading beam is correct, it is necessary for the width of the relief track to be constant, this track being obtained for example after photochemical treatment of the insolated layer. This is realised when the energy effectively received by the photosensitive layer during insolation is kept constant.

According to the invention there is provided an optical system for recording information on a photosensitive layer deposited on a substrate, comprising a coherent light source for emitting a radiation beam, said source having a control input, optical means for dividing said beam into a reference beam and a second beam, an optical device for focusing said second beam onto said photosensitive layer, a first part of said second beam being transmitted to said photosensitive layer and a second part being reflected by said photosensitive layer, first means for detecting said reference beam having an output for delivering a first signal proportional to the energy E(t) of said second beam, second means having an output for delivering a second signal proportional to the energy R(t) E(t) reflected by said photosensitive layer, an initialisation device having two outputs for memorising signals characteristic of the energies E(t) and R(t) E(t) at an instant taken as reference, said energies being Eo and RoEo, and a computing circuit having four inputs respectively connected to said first and second outputs and to said outputs of said initialisation device for forming an error signal, said error signal being applied to said control input of said source, the energy when transmitted to said photosensitive layer being kept constant.

For a better understanding of the present invention, and to show how the same may be carried into effect, reference will be made to the following description and the attached drawings among which:

Assuming Ro and To to be the reflexion and transmission coefficients in a first zone of the surface of the photosensitive layer, Eo the energy received by the photosensitive layer in this first zone, and R and T are the reflexion and transmision coefficients in a second zone of a photosensitive layer.

It is known that:

$$Ro + To = 1$$

$$R + T = 1$$

and $$RoEo + ToEo = Eo$$

The energy which has to be emitted by the light source for the energy transmitted to be constant, i.e. E, is such that:

$$ToEo = TE$$

with $$RE + TE = E$$

i.e.  $$E = Eo\left(\frac{1 - Ro}{1 - R}\right)$$

The variation in the energy emitted by the laser for the energy transmitted to be constant is $$\Delta E = Eo\left(\frac{1 - Ro}{1 - R} - 1\right).$$

The recording system according to the invention comprises a control device which, from the energy reflected by the different zones of the photosensitive layer and from the energy emitted by the source, forms an error signal proportional to $\Delta E$ which constitutes the signal for controlling variations in the energy emitted.

Figure 1:
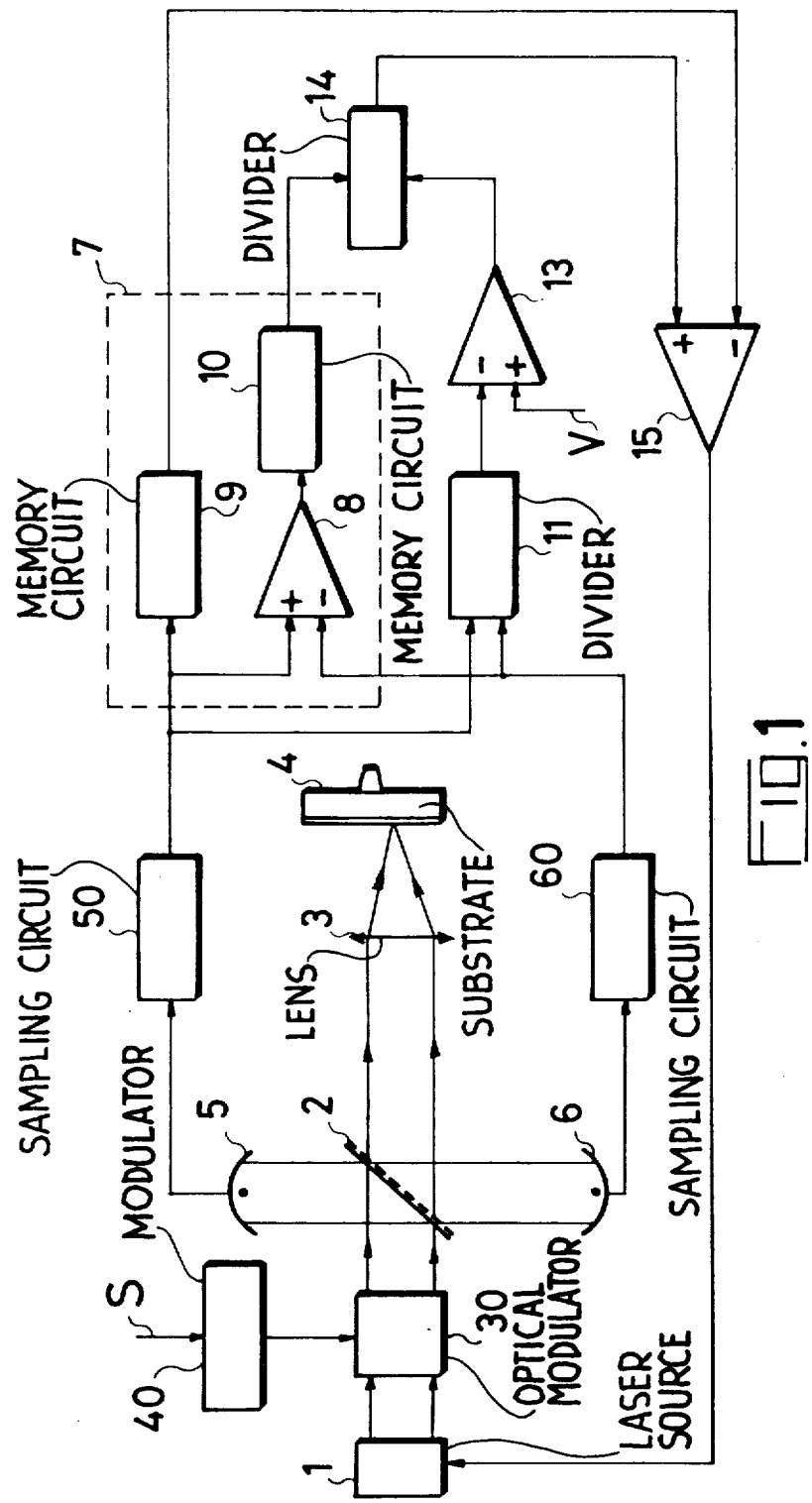
FIG. 1 illustrates the optical recording system according to the invention.

In FIG. 1, a laser source 1 emits a substantially parallel beam. An optical modulator 30, controlled by a width modulated square carrier wave coming from the modulator 40 which received the information signal S to be recorded, modulates the light beam emitted by the laser. A separating plate 2 enables the beam issuing from the modulator to be divided into a beam directed towards a converging lens 3, which enables the beam to be focused onto the photosensitive material deposited onto a substrate 4 in the form of a disc adapted for rotation, and a reference beam directed towards a photodetector 5.

The energy collected by the detector 5 is always proportional to the energy received by the photosensitive material. Let Eo be this energy at an instant taken as origin, and E(t) this energy as a function of time. Part of this received energy is transmitted to the photosensitive material. The other part is reflected and passes back through the lens 3; after which it is reflected by the plate 2 and collected by a photodetector 6. The electrical signals supplied by the detectors 5 and 6 are respectively applied to sample hold circuits 50 and 60 which sample the electrical signals for the leading fronts of the pulses corresponding to the illumination periods and keep the value of the electrical signal memorised for maximum illumination up to the next sampling operation.

The outputs of the sampling circuits 50 and 60 are connected to the inputs of an storage device 7 (shown in dotted lines on FIG. 1) comprising a differential amplifier 8, the "−" input of which is connected to the output of the sampling circuit 60, and the "+" input of which is connected to the output of the sampling circuit 50.

The output of the sampling circuit 50 is also connected to the input of a first memory circuit 9, whilst the output of the differential amplifier 8 is connected to a second memory circuit 10, the outputs of these two memory circuits forming the outputs of the storage device 7.

At the instant taken as origin, the detector 5 detects energy proportional to Eo received by the photosensitive material. This energy proportionl to Eo is memorised whilst the differential amplifier 8 delivers a signal proportional to Eo − RoEo, the memory circuit 10 memorising the value. The values Eo and Eo − RoEo are the values which will be taken as reference values for regulating the power emitted by the laser.

To this end, the outputs of the sampling circuit 50 and 60 supplying the energies E(t) and R(t)E(t), respectively, are connected to the two inputs of a divider 11 which at each instant gives a signal proportional to R(t), the reflexion coefficient of the material in the insolated zone of the surface of the carrier. The output of the divider 11 is connected to the "−" input of a unit gain differential amplifier 13 which at its "+" input receives a reference voltage V characteristic of a total reflexion (reflexion coefficient equal to 1). Accordingly, the output of this amplifier supplies a signal of amplitude proportional to 1 − R(t) which is applied to an input of a divider 14, the other input of which being connected to the output of the memory circuit 10. The output of the divider 14 supplies a signal proportional to $$Eo\left(\frac{1-Ro}{1-R(t)}\right).$$

This output is connected to the "+" input of a differential amplifier 15, the "−" input of which is connected to the output of the memory circuit 9. Thus the output signal of the differential amplifier 15 is proportional to $$\Delta E = Eo\left(\frac{1-Ro}{1-R(t)} - 1\right) = Eo\left(\frac{R(t)-Ro}{1-R(t)}\right)$$

and is thus proportional to the incident energy variation of the light beam supplied by the laser 1. This error signal, is applied to the control input of the laser source for controlling the energy supplied by the laser, and enables the energy emitted by the laser to be increased or reduced so that the energy variation of the light beam concentrated onto the information support is equal to Δ E.

At any instant, therefore, this energy will be:

$$E(t) = Eo + Eo\left(\frac{1-Ro}{1-R(t)} - 1\right) = \frac{Eo\,To}{T(t)}$$

In order to ensure that the device for controlling the energy supplied by the laser with detected variations of the reflexion coefficient of the diopter formed by the air and the photosensitive layer deposited onto the substrate functions satisfactorily, it is necessary for the incident beam to be focused onto that layer at any moment. To this end, it is necessary to use a focusing control device which is unaffected by the variations in the power emitted by the laser.

The device described hereinafter is particularly adapted for controlling focusing because it uses the ratio between two amounts of light as the focusing criterion, and is thus unaffected by the variations in the energy emitted by the laser.

This device utilises the results obtained by the tests described in the following.

Figure 2:
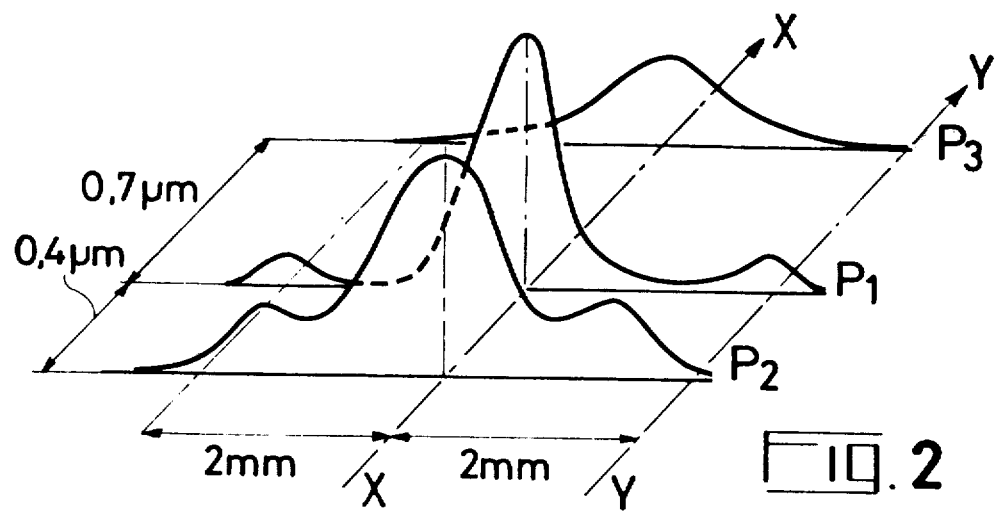
FIG. 2 represents light distribution for different positions of the surface S relatively to the focusing plane.

When the inscription spot insolating the photosensitive layer is obtained from a coherent light source by means of a lens with a large numerical opening, the energy reflected by the photosensitive layer, depending on whether this reflecting surface S is behind or ahead of the focusing plane of the incident beam, is not distributed in the same way in a plane conjugated with the focusing plane of the incident beam relative to the lens, as shown by curves $P_1$, $P_2$ and $P_3$ in FIG. 2. The curve $P_1$ represents the distribution of energy in the conjugated plane when the surface S coincides with the focusing plane, the curve $P_2$ represents this distribution when the surface S is behind the focusing plane and the curve $P_3$ represents this distribution of energy when the surface S is between the lens and the focusing plane.

This result may be interpreted with FIGS. 3 and 4 which represent the situations giving the curves $P_2$ and $P_3$ in the following manner:

The distribution of energy emitted by the laser follows a substantially gaussian law, the light being maximum on the optical oxis of the beam along a straight line perpendicular to this optical axis.

In the focusing plane of this beam, the distribution of energy is very similar to an Airy distribution, the central spot being extremely brilliant. This distribution is reencountered in the detection plane which is conjugated with the focusing plane relative to the lens.

Figure 3:
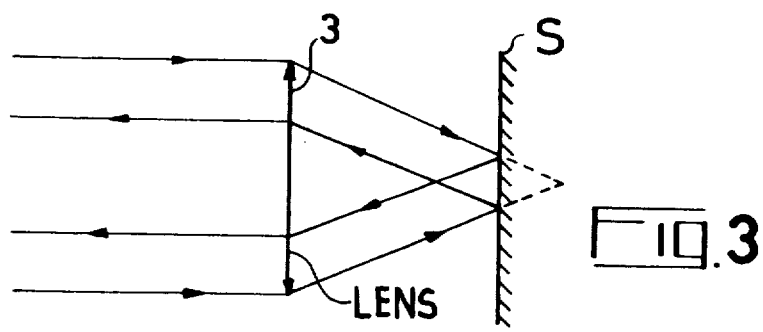
FIGS. 3 and 4 represent optical diagrams for two different positions of the surface S.

When the reflecting surface S is situated between the lens and the focusing plane, the distribution of energy obtained on the reflecting surface substantially follows a gaussian law which is reencountered in the detection plane because all the rays reflected by the surface S pass back through the system, as shown in FIG. 3. The energy collected by a detector centered on the first order in the detection plane thus decreases rapidly when the reflecting surface coincides with the focusing plane.

Figure 4:
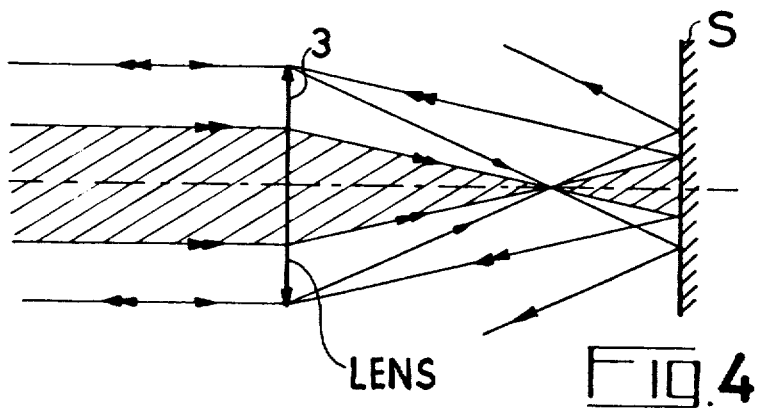

On the other hand, when the reflecting surface S is situated behind the focusing plane relative to the lens, FIG. 4 shows that only the central part of the incident beam is returned by the reflecting surface through the lens and its pupil (hatched area in FIG. 4).

The distribution of light in the corresponding useful surface of the reflecting plane corresponds to the central part of a gaussian law which may be compared with a distribution of constant amplitude throughout this surface and zero beyond it. In that case, the preponderant phenomenon is due to the diffraction of the return beam by the pupil of the lens. The diffraction figure obtained in the focusing plane of the return beam is formed by concentric ring in accordance with Fraunhoffer's theory. However, since the detection plane no longer coincides with the focusing plane of the return beam, the ring corresponding to the first order approaches the central order. The light collected by the detector centered on the central order in the focused position decreases rapidly.

If X is the light received by a detector centered on the central order when the reflecting surface coincides with the focusing plane of the incident beam, and if Y is the light received by a detector centered on the first order under the same conditions, the ratio X/Y has a given value when the reflecting surface corresponds to the focusing plane, this value increasing when the reflecting surface approaches the lens and decreasing when the reflecting surface moves away from the lens. These results are correct in a range of a few tenths of a micron ahead of and behind the focusing plane, taking into account the large numerical opening of the lens. The latitude in regard to the position of the detection plane is considerable because of the axial linear magnification of the lens used. For a magnification G of the order of 1000, an error 10 cm in the position of the detection plane will produce an error of only one tenth of a micron in the position of the reflecting surface.

Figure 5:
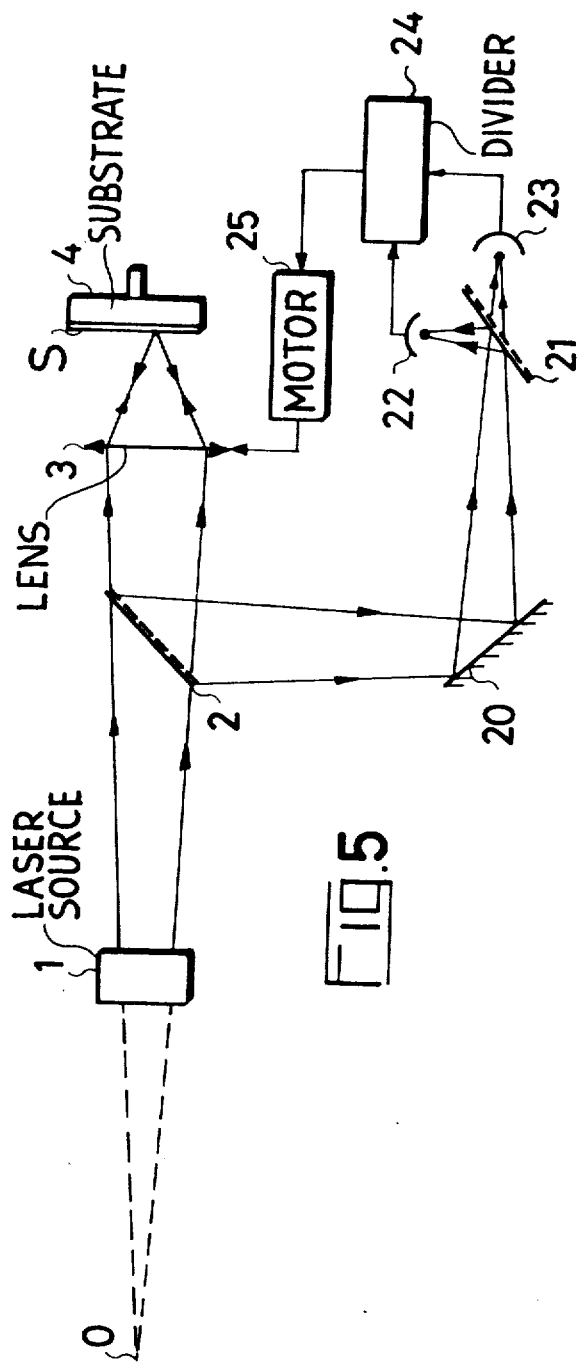
FIG. 5 illustrates a complementary device enabling the beam to be correctly focused irrespective of any variations in the energy emitted by the source.

The arrangement shown in FIG. 5 utilises this result in order to regulate the displacement of the lens 3 in response to variations in the ratio between the amounts of light received by two detectors one of which being centered on the central order and the other on the first order, these two detectors being located near the plane conjugated with the focusing plane of the incident beam relative to the lens.

FIG. 5 shows only the control device which have to be included in the arrangement illustrated in FIG. 1, identical components having been denoted by the same references in these two Figs. The laser source 1, the plate 2, the lens 3 and the data carrier 4 are arranged in the same way as in FIG. 1. The beam reflected by the surface S of the data carrier 4 is reflected by the same plate 2 and then by a mirror 20. A second separation plate 21 separates the beam into two beams.

A detector 22 centered on the central order is placed in a plane perpendicular to the optical axis of one of these two beams, whilst a detector 23 centered on the first order is placed in a plane perpendicular to the optical axis of the second beam, the two detectors 22 and 23 being situated at the same distance from the separation plate 21 and at a distance from the separation plate 2 equal to the distance from the point O, the virtual object corresponding to the beam emitted by the laser source due to the natural divergence of this beam, to the same separation plate 2. Illumination X and Y received by these two detectors are converted into electrical signals which are applied to the two inputs of a divider 24 which supplies an electrical signal proportional to the ratio X/Y of the light received by the detector 22 centered on the central order to the light received by the detector 23 centered on the first order. The coefficient of proportionality introduced by the divider is such that, when the reflecting surface S of the information support coincides with the focusing plane of the incident beam, the signal characteristic of the ratio X/Y has a reference value. This signal is the signal controlling a motor 25 which controls the displacement of the lens 3, moving it towards the information support 4 when the signal characteristic of the ratio X/Y has a value below the reference value, and moving it away in the opposite case.

This focusing control device is only limited in its sensitivity by the noise introduced by the detector.

The device controlling the power supplied by the laser makes it possible to obtain a recording system which records along a track of substantially constant width. It is by no means confined to the embodiment which has been described and illustrated. It may be formed by amplifiers and dividers arranged in a different manner, provided that the error signal obtained is characteristic of the variation in energy transmitted to the photosensitive layer.

In addition, with regard to the focusing control device, the signal proportional to X/Y, characteristic of the focusing deviation, may be used for compensating the slow variations in control rather than directly in the lens control loop, the focusing deviation sensor being of another type, for example capacitive, and the control signal being the output signal from this deviation sensor.

The system according to the invention may be used for recording audio-video signals on data-carriers having disc or tape form.

What we claim is:

1. An optical system for recording information on a photosensitive layer deposited on a substrate, comprising a coherent light source for emitting a radiation beam, said source having a control input, optical means for dividing said beam into a reference beam and a second beam, an optical device for focusing said second beam onto said photosensitive layer, a first part of said second beam being transmitted to said photosensitive layer and a second part being reflected by said photosensitive layer, first means for detecting said reference beam having a first output for delivering a first signal proportional to the energy E(t) of said second beam, second means having a second output for delivering a second signal proportional to the energy R(t) E(t) reflected by said photosensitive layer, storage means for storing signals characteristic of the energies E(t) and R(T) E(t) at an instant taken as reference, said energies being Eo and RoEo, said storage means having two outputs, and logic means having four inputs respectively connected to said first and second outputs of said storage means for forming an error signal, said logic means having an output for delivering said error signal, said output of said logic means being connected to said control input of said source, the energy when transmitted to said photosensitive layer being kept constant.

2. An optical recording system as claimed in claim 1, wherein said energy E(t) of said radiation beam emitted by said source is controlled by said error signal for being substantially proportional to:

$$\frac{Eo - EoRo}{1 - R(t)}.$$

3. An optical recording system as claimed in claim 2, wherein said error signal is proportional to $$Eo\left(\frac{1 - Ro}{1 - R(t)} - 1\right),$$

variations in the energy of said radiation beam being proportional to said error signal.

4. An optical recording system as claimed in claim 3, wherein said first means and said second means are respectively located on the path of said reference beam and on the path of a first further beam derived from said second part of said second beam reflected by said photosensitive layer, said first means and said second means comprising photoelectric transducers.

5. An optical recording system as claimed in claim 1, further comprising control means having a control input providing displacement of the focusing point of said second beam, means for detecting the focusing deviation between the focusing point of said second beam and said photosensitive layer formed with first and second further photoelectric transducers having respective outputs, located on the path of a second further beam derived from said second beam, said first and second further photoelectric transducers being respectively centered on the central order and on the first order of said second further beam, and a divider having two inputs coupled to said respective outputs for delivering a focusing error signal designed to be applied to said control input of said control means.

* * * * *